D. NYSEWANDER.
Wind-Engine.
No. 8,566. Reissued Feb. 4, 1879.
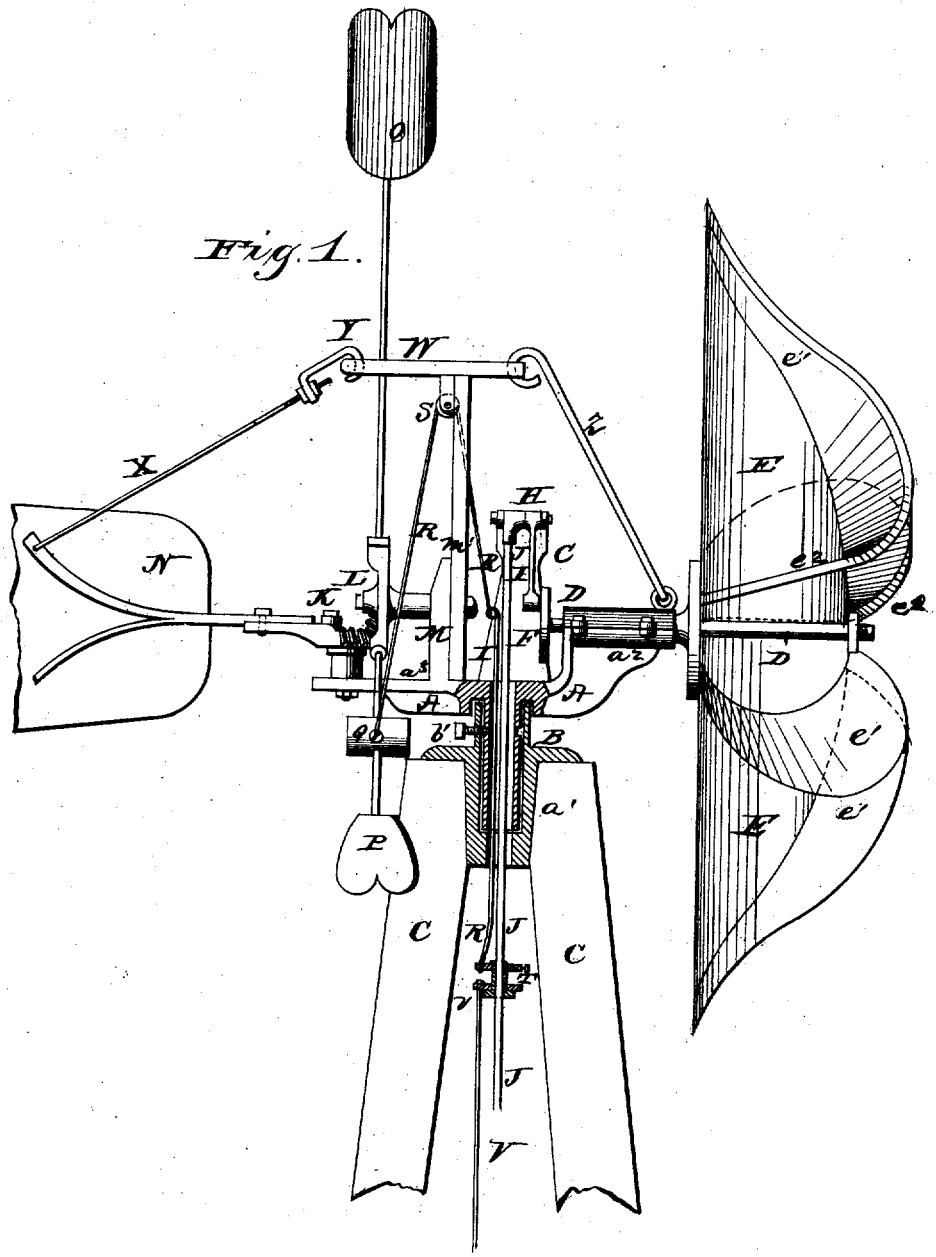
WITNESSES
F. L. Durand.
H. Aubrey Toulmin
By
INVENTOR
D. Nysewander
Alexander Dittmar & Son
ATTORNEYS
N. PETERS, PHOTO-LITHOGRAPHER, WASHINGTON, D. C

D. NYSEWANDER.
Wind-Engine.
No. 8,566. Reissued Feb. 4, 1879.
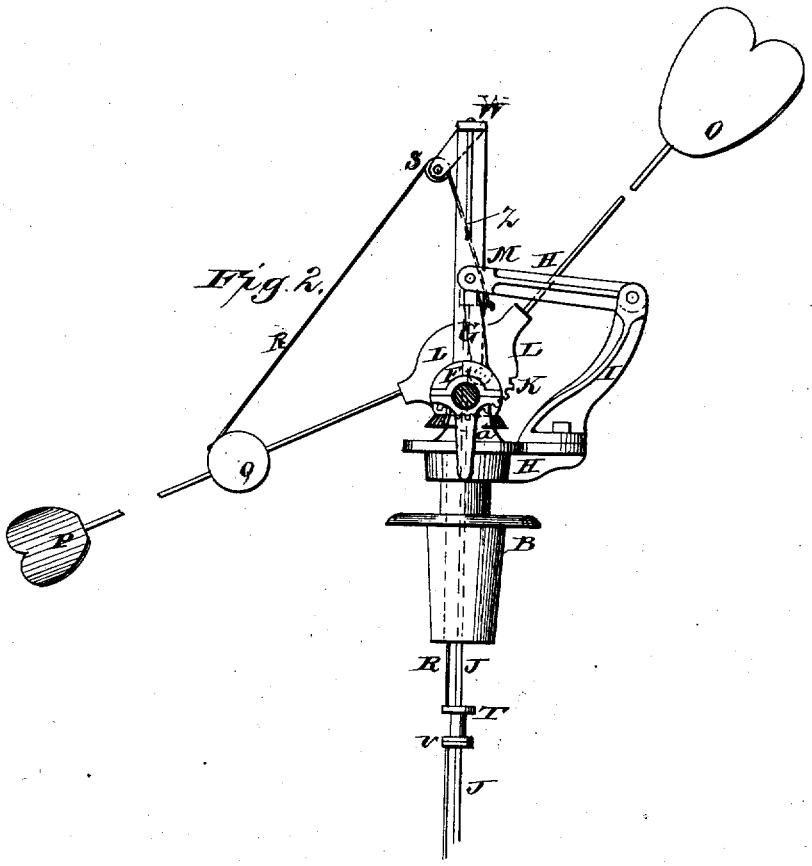
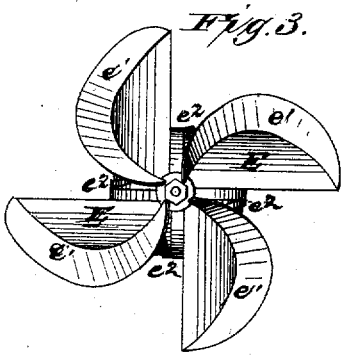
WITNESSES
F. L. Durand
H. Aubrey Toulmin
By
INVENTOR
D. Nysewander
Alexander Simpson
ATTORNEYS
N. PETERS, PHOTO-LITHOGRAPHER, WASHINGTON, D. C.

UNITED STATES PATENT OFFICE.

DANIEL NYSEWANDER, OF SPRINGFIELD, OHIO.

IMPROVEMENT IN WIND-ENGINES.

Specification forming part of Letters Patent No. 189,132, dated April 3, 1877; Reissue No. 8,566, dated February 4, 1879; application filed December 18, 1878.

*To all whom it may concern:*

Be it known that I, DANIEL NYSEWANDER, of Springfield, in the county of Clarke and State of Ohio, have invented certain new and useful Improvements in Windmills; and I do hereby declare that the following is a full, clear, and exact description thereof, reference being had to the accompanying drawings, and to the letters of reference marked thereon, which form a part of this specification.

Figure 1, Sheet 1, is a side view of my improved windmill, partly in section to show the construction. Fig. 2, Sheet 2, is a detail view of the automatic adjusting mechanism. Fig. 3, Sheet 2, is a front view of the wind-wheel.

Similar letters of reference indicate corresponding parts.

The object of this invention is to improve the construction of the windmill for which Letters Patent No. 181,196 were issued to me August 15, 1876, so as to make it more effective in operation and enable it to be more effectually controlled.

The invention consists in an upright bar and an adjustable brace or bolt connecting said bar with a swinging vane; in the combination of a swinging vane, cogged segments, and a threaded bolt or brace with adjusting-nut connecting the vane with the upright supporting-bar; in the combination of the two segmental gear-wheels, the two regulating-vanes, and the adjustable weight with the turn-table and the main vane; in the combination of the flaring flanges with the edges of the wings of the wind-wheel; in the combination of the brace-bars with the flanges and the wings of the wind-wheel; and in the combination of the upright bar, the cross-bar, the hinge-bar, and the two brace-bars with the turn-table and the vane, as hereinafter fully described.

A is the turn-table, upon the lower side of which is formed a long hollow spindle, $a^1$, which passes down through a sleeve or socket, B, and is secured in said socket, and at the same time allowed to revolve freely by a set-screw, $b'$, passing in through the upper part of the said socket B, and entering a ring-groove in the said hollow spindle $a^1$.

The socket B has a ring-flange formed around it near its upper end, which rests upon and is secured to the top of the frame or tower C.

Upon the forward side of the turn-table A is formed an arm, $a^2$, to receive and support the shaft D. To the shaft D is secured the hub of the wheel E, which is formed by slitting a square plate of sheet metal of suitable size from its corners nearly to its center, and bending one of the two points thus formed at each corner forward, and securing it to a collar or head attached to the outer end of the shaft D. To the curved edge of the wings of the wheel E are attached flaring flanges $e^1$, to present a larger surface to catch the wind. To the outer edges of the flanges $e^1$ of the wings of the wheel E are attached strips $e^2$, which, at or near the inner ends of said flanges, are bent outward, pass around the bases of the wings, and are attached to the hub of the said wheel, to serve as braces to strengthen the wheel E. To the inner end of the shaft D is attached a small crank-wheel, F, to the crank-pin of which is pivoted the lower end of the connecting-rod G.

The upper end of the connecting-rod G is pivoted to the inner end of the arm H, the outer end of which is pivoted to the upper end of the bracket I.

The lower end of the bracket I is secured to a projection or lug formed upon the turn-table A. The arm H is made of such a length that its inner end may be directly over the cavity of the hollow spindle $a^1$, and to said inner end is pivoted the upper end of the rod J, which passes down through the cavity of the said hollow spindle $a^1$, and with the lower end of which is connected the pump or other machinery to be driven.

Upon the turn-table A, directly opposite the wheel-bracket $a^2$, is formed an arm or bracket, $a^3$, to which is pivoted a segmental bevel-gear wheel, K, the teeth of which mesh into the teeth of a segmental bevel-gear wheel, L, pivoted to an upright arm, M, formed upon the turn-table A. To the segment K is attached the main vane N, and to the segment L are attached the stems of two vanes, O P, which project upon the opposite sides of the turn-table A, and are set at such an angle that the wind may tend to turn them toward the main vane N and throw the wheel E out of the wind.

To the stem of the vane P is adjustably attached a weight, Q, of such a size as to hold the wheel E to the wind until the wind has increased in force beyond a certain point. If the wind still further increases in strength, the wheel E will be turned entirely out of the wind, and will stop. When the wind decreases in force the wheel E will be again turned into the wind by the action of the weight Q.

To the weight Q is attached a cord or chain, R, which passes over a pulley, S, pivoted to the cross-bar W. The chain R, or a rod attached to said chain, passes down through the hollow spindle $a^1$, and is attached to a sleeve, T, through which the rod J passes, and to which is swiveled a ring, U. To the swiveled ring U is attached the end of a cord, V, which extends down into such a position that it may be conveniently reached and operated by the attendant to raise the weight Q, throw the wheel E out of the wind, and stop it when desired.

To the upright arm M is attached an upright bar, $m'$, to the upper end of which is attached a bar, W. To the rear end of the bar W is formed a hole to receive the hook formed upon an arm of the U-shaped bar Y, the other arm of which has a hole formed through it to receive the end of the brace-bar X. The bar Y thus forms a hinge for the brace X, which is attached to the vane N, so that the said brace, while strengthening and supporting the said vane N, will not interfere with its movements.

To the forward end of the bar W is attached the end of a brace, Z, the other end of which is attached to the arm $a^2$, that carries the shaft D.

The vane N of the windmill would, unless suitably supported, necessarily sag, so that its weight would come on the segments and bind so as to prevent the mill from regulating. In order to prevent this difficulty, and at the same time to be able to take up or raise the vane, I use the threaded brace X with adjusting-nut, as shown and described. By this arrangement, any time the vane should sag so that its weight would be too much on the segment, the vane can be raised by the use of this threaded bolt or brace and the adjusting-nut to relieve the binding of the cogged segments and make them work free.

Having thus described my invention, I claim as new and desire to secure by Letters Patent—

1. In a windmill having a swinging vane, an upright bar and an adjustable brace or bolt connecting said bar, as described, with the swinging vane, for the purpose of raising and lowering the vane, substantially as herein set forth.

2. The combination of the swinging vane N, cogged segments K L, and the threaded bolt or brace X with adjusting-nut connecting the vane with the upright supporting-bar, as described, substantially as and for the purposes herein set forth.

3. The combination of the segmental gear-wheels K L, the two regulating-vanes O P, and the weight Q with the turn-table A and the main vane N, substantially as herein shown and described.

4. The combination of the flaring flanges $e^1$ with the edges of the wings of the wheel E, substantially as herein shown and described.

5. The combination of the bars $e^2$ with the flanges $e^1$ and the wings of the wheel E, substantially as herein shown and described.

6. The combination of the upright bar $m'$, the cross-bar W, the hinge-bar Y, and the brace-bars X Z with the turn-table A and the vane N, substantially as herein shown and described.

In testimony that I claim the foregoing I have hereunto set my hand this 5th day of December, 1878.

DANIEL NYSEWANDER.

Witnesses:
H. HALLENBECK,
A. T. BYERS.